United States Patent [19]

Ferrari et al.

[11] Patent Number: 4,744,942
[45] Date of Patent: May 17, 1988

[54] NUCLEAR REACTOR SPACER GRID LOADING

[75] Inventors: Harry M. Ferrari, Edgewood Boro; Elwyn Roberts, Pittsburgh; Edmund E. DeMario, Penn Hills Township, Allegheny County, all of Pa.

[73] Assignee: Westinghouse Electric Corp., Pittsburgh, Pa.

[21] Appl. No.: 872,988

[22] Filed: Jun. 11, 1986

[51] Int. Cl.[4] .............................................. G21C 3/34
[52] U.S. Cl. .................................... 376/442; 376/285; 376/438; 376/445
[58] Field of Search ............... 376/442, 438, 445, 462, 376/441, 285

[56] References Cited

U.S. PATENT DOCUMENTS

| | | | |
|---|---|---|---|
| 3,379,619 | 4/1968 | Andrews et al. | 376/439 |
| 3,389,056 | 6/1968 | Frisch | 376/442 |
| 3,713,971 | 1/1973 | VanSanten et al. | 376/438 |
| 3,944,467 | 3/1976 | Biermann et al. | 376/442 |
| 4,059,483 | 11/1977 | Anthony | 376/442 |
| 4,061,536 | 12/1977 | Creagan et al. | 376/442 |
| 4,224,107 | 9/1980 | Delafosse et al. | 376/442 |
| 4,357,298 | 11/1982 | Wolters, Jr. et al. | 376/442 |
| 4,474,730 | 10/1984 | Hellman et al. | 376/462 |

Primary Examiner—Stephen C. Bentley
Assistant Examiner—Daniel Wasil

[57] ABSTRACT

Spacer grids for a nuclear fuel assembly are arranged in superadjacent groups having grid springs and opposing dimples which contact a fuel rod passing through a cell of the spacer grid with a selected spring force. As fabricated, the lowermost grid exerts the greatest initial spring force on the rod; intermediate grids exert a smaller spring force; and the uppermost grid exerts yet a lower spring force. The fuel rod is supported laterally while it is permitted to age expand axially with little axial compression resulting from the spring forces of the springs and dimples, whereby bowing of the rod is diminished.

11 Claims, 2 Drawing Sheets

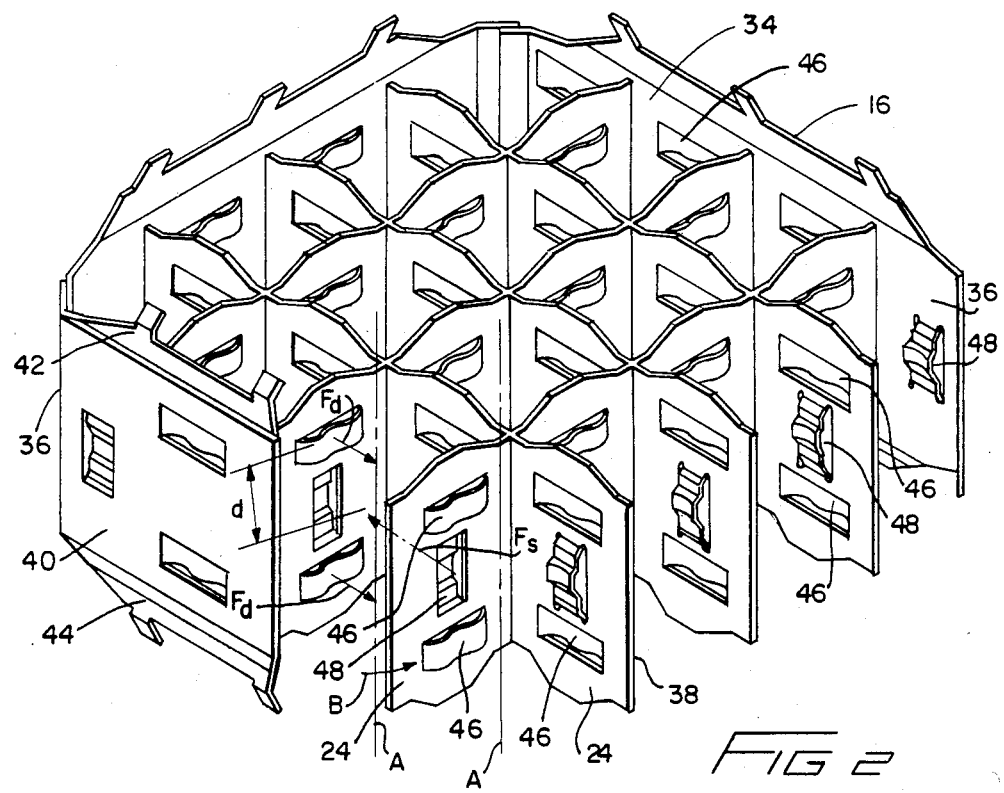
FIG 2
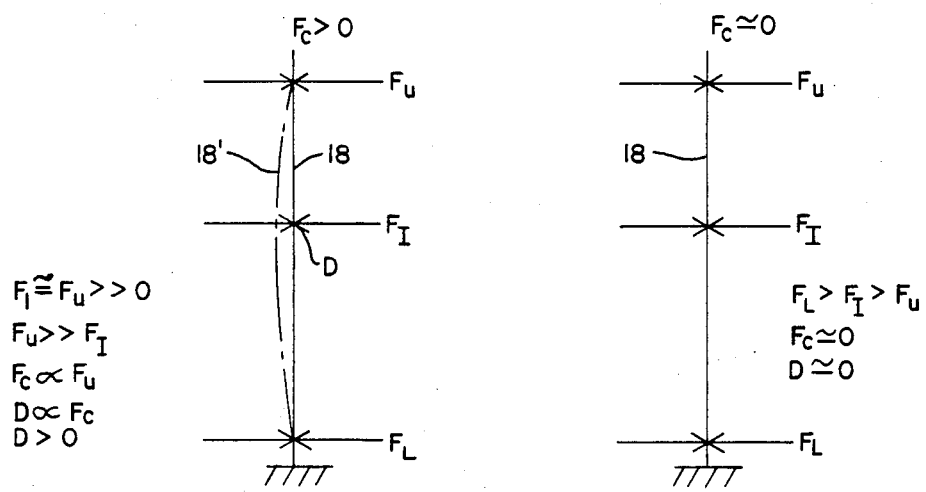
FIG 3A
PRIOR ART
FIG 3B

NUCLEAR REACTOR SPACER GRID LOADING

CROSS-REFERENCE TO RELATED APPLICATION

Reference is hereby made to the following copending application dealing with related subject matter and assigned to the assignee of the present invention:

"Nuclear Reactor Spacer Grid" by Lynne E. Weiland et al, assigned U.S. Ser. No. 719,107 and filed Apr. 2, 1985.

BACKGROUND OF THE INVENTION

1. Field of the Invention

The present invention relates generally to nuclear reactor fuel assemblies and more particularly to an improved loading of spacer grid springs for spacing and cradling fuel rods in a nuclear fuel assembly.

2. Description of the Prior Art

In a nuclear fuel assembly, spacer grid assemblies are used to precisely maintain the spacing between the fuel rods in a nuclear reactor core, to prevent rod vibration, and to provide lateral support for the fuel rods. Conventional spacer grid assembly designs include a multiplicity of metal grid straps, interlocked into an egg-crate configuration designed to form cells through which fuel rods (standard cells) and control rod guide thimbles (thimble cells) pass. Slots are often utilized to effect the interlocking engagement between grid straps. Each standard cell provides support for one fuel rod at a given axial location through the use of relatively resilient grid springs and relatively rigid protuberances (dimples) formed in or attached to the metal grid straps. A peripheral strap may be used to enclose the interlocked grid straps in order to impart strength and rigidity to the fuel assembly and to provide grid spring and dimple locations for the peripheral cells. In order to minimize the lateral displacement of fuel rods during ooperation and to improve the fuel characteristics of a fuel assembly, a number of such spacer grid assemblies may be spaced along the fuel assembly length. These grids are generally held in place by attachment to the control rod guide thimbles by known techniques.

Examples of such spacer grid assemblies may be found in U.S. Pat. No. 3,389,056 to E. Frisch, U.S. Pat. No. 3,713,971 to Van Santen et al, U.S. Pat. No. 3,944,467 to Biermann et al, U.S. Pat. No. 4,224,107 to Delafosse et al, or U.S. Pat. No. 4,474,730 to Hellman et al.

During operation of a nuclear reactor, the grid springs and dimples undergo exposure to radiation. Depending on the amount of irradiation, the material used for the grid springs will lose some of its initial spring force, thus permitting the fuel rods to vibrate and chatter against the springs and dimples. If vibration is severe, the result may be fretting of the fuel rod cladding.

Some known grid assemblies are constructed of zirconium or zirconium alloy. (Both terms hereinafter generally are referred to interchangeably as Zircaloy.) Some grids are fabricated from Inconel or Zircaloy/Inconel composites. Although Inconel is a preferred material for the springs because it has a high spring force which is relatively insensitive to radiation-induced relaxation, it has a high neutron absorption cross-section. Thus, the use of Inconel in large quantities results in a significant economic penalty. Zircaloy, on the other hand, has a low neutron cross-section but relaxes under high heat and radiation and thereby initially loses almost 30% of its spring strength due to high heat (e.g., 600° F.), and typically loses up to nearly 90% of its remaining spring force after one year of intense radiation.

In a typical reactor having an upper and lower grid and a number of intermediate grids, Inconel is used in the lower grid because, even though it has a high neutron absorption cross-section, a strong, long-term spring force is necessary to prevent vibration-induced fretting of the fuel rods due to the high turbulence at the inlet of the fuel bundle. Additionally, Inconel is used in the upper grid near the top of the fuel rod where there is relatively little radiation in the gas plenum area. In both cases, Inconel retains its resisting strong spring force under irradiation. Zircaloy is often used in intermediate grids where strong spring force is not as critical as at the ends, to space and support the fuel rods without significant neutron absorption.

Although mixed arrangements of Inconel and Zircaloy grids perform well, one significant problem occurs, namely high rod bow, caused in part by a bending moment produced by the offset lateral application of relatively strong upper and lower grid spring and dimple forces at the ends of the rods. Rod bow is aggravated by axial compression of the rod. As a fuel rod undergoes irradiation, it tends to grow axially. As a rod grows, the relatively strong spring force of the upper grid tends to resist the growth and thereby places the rod in compression. The rod bows as a result of the axial compressive force and the bending moment, coupled with radiation-induced relaxation of the intermediate Zircaloy grid springs, which results in insufficient intermediate spring force to keep the rods straight at the intermediate grid locations.

High bowing is undesirable because it results in significant departure from nuclear boiling (DNB) heat transfer penalty, accelerated Zircaloy corrosion if two fuel rods touch, and a negative customer perception if the fuel rods are not visibly straight.

SUMMARY OF THE INVENTION

It is therefore an object of the invention to provide a spacer grid assembly design which will reduce any tendency of the fuel rods to become bowed during use.

It is a further object of the invention to provide an improved spacer grid assembly which distributes grid spring forces along the fuel rod so as to reduce the bending moment and the axial compressive force in the rod.

To achieve these as well as other objects, and in accordance with the present invention, a nuclear fuel assembly containing a plurality of fuel rods is provided. A plurality of superadjacent spacer grid assemblies are axially disposed along the fuel rods for maintaining the fuel rods in a spaced lateral array. Said plurality of grids includes respective upper and lower grids located near respective upper and lower ends of the fuel rods and at least one intermediate grid located therebetween. Each of the spacer grid assemblies comprises a plurality of grid straps interlocked into an egg-crate configuration to form standard cells through which the fuel rods pass. Each of the standard cells has at least one, and preferably two, grid springs and each grid spring has one, and preferably two, opposing dimples.

The upper grid is fabricated with a relatively low spring force. The lower grid is fabricated with a relatively high spring force. The intermediate grids have a relatively high fabricated spring force, although over time the intermediate spring force will be diminished by radiation-induced relaxation.

Additional objects, advantages and novel features of the invention will be set forth, in part in the description which follows, and in part will become apparent to those skilled in the art by practice of the invention. The objects and advantages of the invention may be realized and attained by means of the invention as particularly pointed out in the appended claims.

BRIEF DESCRIPTION OF THE DRAWINGS

FIG. 2 is an isometric view, partially broken away, of a preferred spacer grid according to the principles of the present invention;

FIG. 3a is a schematic representation of the resulting forces on a typical fuel rod in a conventional spacer grid;

FIG. 3b is a schematic representation of the resulting forces on a typical fuel rod in the spacer grid of the subject invention.

DETAILED DESCRIPTION OF THE INVENTION

Figure 1:
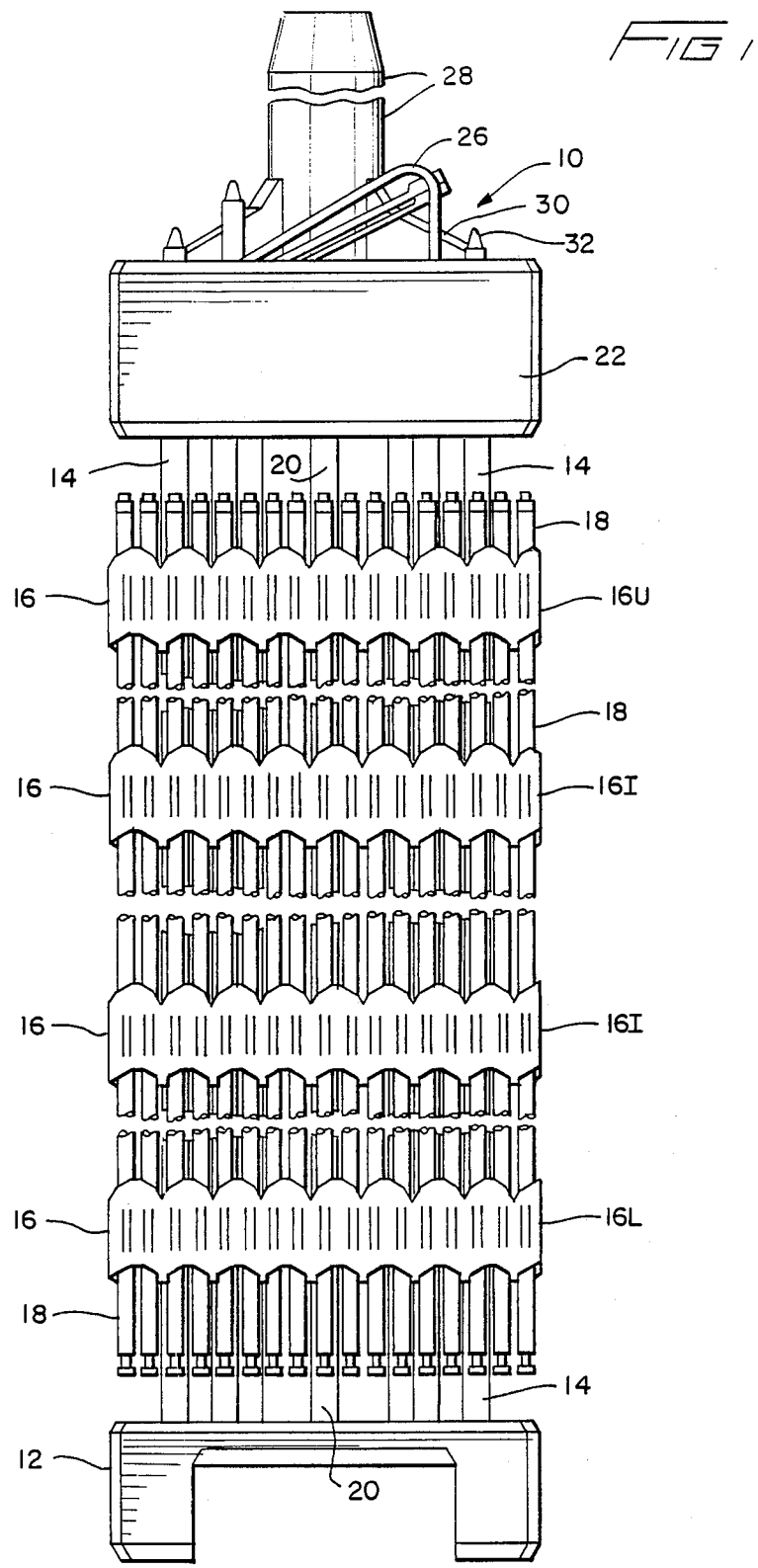
FIG. 1 is an elevational view of a fuel assembly incorporating the improved spacer grid structure in accordance with the principles of the present invention.

Reference will now be made in detail to a presently preferred embodiment of the invention, an example of which is illustrated in the accompanying drawings and described in greater detail in the aforementioned Ser. No. 719,107, the contents of which are hereby incorporated by reference. In the following description, it is to be understood that terms such as "forward", "rearward", "left", "right", "downwardly", and the like are words of convenience and are not to be construed as limiting terms.

Referring now to the drawings and particularly to FIG. 1, there is shown a conventional fuel assembly constructed in accordance with well known practices and generally indicated by the reference numeral 10. The fuel assembly 10 basically comprises a well known lower end structure or bottom nozzle 12 for supporting the assembly in the core region of a reactor (not shown). A number of axially extending control guide tubes or thimbles 14 project upwardly from the bottom of nozzle 12. A plurality of spacer grids 16 (only four of which are shown) for transversely spacing and supporting an organized array of elongated fuel rods 18 are axially spaced along guide thimbles 14.

The spacer grids 16 are divided into three superadjacent categories, as folloas: lower grid 16L, one or more intermediate grids 16I, and upper grid 16U. As shall be hereinafter described, the grids 16, although generally identical in construction, have differences which produce the resultant benefits of the present invention.

Preferably, an instrumentation tube 20 is located in the center of the assembly and an upper end structure or top nozzle 22 is attached to the upper ends of the guide thimbles 14 in a conventional manner to form an integral assembly capable of being conventionally handled without damaging the assembly components. The bottom nozzle 12 and the top nozzle 22 are conventional, including means (not shown) for directing the upward longitudinal flow of a liquid coolant, such as water, to pass up and along the various fuel rods 18 to receive the thermal energy therefrom.

Disposed within an opening defined by the sidewalls of the top nozzle 22 is a conventional rod cluster control assembly 28 having radially extending flukes 30 connected to the upper end of control rods 32 for vertically moving the control rods in the control rod guide thimbles 14 in a well-known manner.

To form the fuel assembly 10, spacer grids 16 are conventionally attached to the longitudinally extending guide thimbles 14 at predetermined axially spaced locations. The fuel rods 18 are inserted into and through standard cells formed by the interlocking grid straps. The lower nozzle 12 is suitably attached to the lower ends of the guide thimbles 14 and the top nozzle 22 is attached to the upper ends of the guide thimbles 14. For a further description of the fuel assembly 10, reference should be made to U.S. Pat. Nos. 4,061,536 and 3,379,619, the contents of which are hereby incorporated by reference.

The fuel assembly 10 depicted in the drawings is of the type having a square array of fuel rods 18 with the control rod guide thimbles 14 being strategically arranged within the fuel rod array. Further, the bottom nozzle 12, the top nozzle 22, and likewise the spacer grid 16 are generally square in cross-section. In that the specific fuel assembly presented in the drawings is for illustrational purposes only, it is to be understood that neither the shape of the nozzles or the grids nor the number and configuration of the fuel rods and guide thimbles are to be limiting, and the invention is equally applicable to shapes, configurations and arrangements other than the ones specifically illustrated.

Before describing the spacer grid structure 16 of the present invention in detail, it is noted that the fuel rods 18 are laterally positioned in a predetermined array by the support of spacer grids 16. Spacer grids per se are well known in the art and are used to precisely maintain spacing between fuel rods, to prevent rod vibration, to provide lateral support and, to some extent, to frictionally retain the rods against longitudinal movement. Conventional spacer grids, such as the ones shown and described in U.S. Pat. Nos. 4,061,536 and 3,379,619, referenced above.

Turning now to FIG. 2, there is depicted a partially broken away, perspective view of a spacer grid 16 which includes a plurality of interfitted grid straps 24 which are arranged in an egg-crate fashion to create standard cells 34 for separately enclosing the fuel rods 18 (not shown in FIG. 2 for the sake of clarity, but shown in FIG. 1). The spacer grid 16 may also have outer straps 36 interconnected to form a generally square-shaped array which surrounds the grid straps 24 about their heightwise edges 38. For some known fuel assemblies which will be used in a boiling water reactor, it is advantageous for each outer strap 36 to have a central portion 40 and top and bottom resilient border portions 42 and 44, respectively. Preferably, the border portions 42 and 44 are integral with the central portion 40. In any event, the heightwise edges 38 of the grid straps 24 are generally fastened to the surrounding outer straps 36 by an appropriate method, for example, welding. The border portions 42 and 44 may vertically extend beyond the central portions 40 of the outer strap 36. The border portions 42 and 44 may alternatively be fashioned to include mixing vane structures 50 to create turbulence and mixing of the coolant flow through the fuel assembly.

In the spacer grid 16, each standard cell 34 has a longitudinal axis (designated by the center line labeled A) and each of its associated grid straps 24 has at least one, and preferably two longitudinally spaced, relatively rigid dimples 46 projecting into the cell 34 on a wall opposing a grid spring 48 for supporting an associated fuel rod 18 therein. Further, it is preferred that each cell 34 have two grid springs, deposed on adjacent walls. Thus, in the preferred embodiment, each fuel rod is supported in each cell at six points.

The dimples 46 on a pair of adjacent associated grid straps are preferably generally open to longitudinal coolant flow therethrough, i.e., they face the coolant flow edgewise, while the grid springs 48 on the other adjacent cell walls are generally closed to fluid flow, i.e., their edges are arranged longitudinally with respect to the direction of coolant flow. As will be understood by the artisan, the orientation of th dimples 46 and grid springs 48 can, of course, be reversed. Alternatively, both the springs 48 and dimples 46 can be formed open with respect to coolant flow or both can be formed closed with respect to coolant flow. It is desirable that the dimples 46 and grid springs 48 project generally perpendicularly towards the longitudinal axis of the cell 34. It is also preferred that where a pair of dimples 46 are formed in the same wall of a cell 34, those dimples 46 be axially spaced and aligned.

Preferably, as shown in FIG. 2 and in further detail in Ser. No. 719,107, the dimples 46 are generally longitudinally running arches and are generally trapezoidal in shape, while the grid springs 48 are generally transversely running arches having a raised portion for cradling a fuel rod 18 and are likewise generally trapezoidal in shape. It is preferred that the dimples 46 and grid springs 48 be integral with the grid straps 24.

Depending upon the location for a particular grid 16, the material used to fabricate the same is selected in accordance with the most predominant functional concerns at each location. For example, in an intermediate portion of the fuel bundle 10, it is important that the neutron absorption cross-section of the grid material be as low as possible in order to avoid parasitic effects. Accordingly, Zircaloy materials are preferred for the intermediate grids 16I, even though such materials do not exhibit long-term resistance to radiation-induced spring relaxation.

Because there is considerable turbulence and cross-flow in the lower portion of the fuel bundle 10, the lowermost grid 16L is formed of a material which has less susceptibility to radiation-induced spring relaxation. Accordingly, even though Inconel has a relatively high neutron absorption cross-section, it is useful to manufacture the lower grid 16L from this material because it is capable of maintaining a relatively high spring force on the rods 18 over the useful life of the fuel bundle 10. The neutron cross-section penalty is of less concern and accordingly is accepted.

The upper grid 16U may also be fabricated from Inconel, although for a somewhat different reason. In the upper portion of the fuel bundle 10, the grid 16U is located at the upper portion of fuel rods 18 in the gas plenum area. Radiation is relatively light in this area, and the parasitic effect of the high neutron cross-section of the upper grid 16U is negligible.

When a fuel rod 18 is located in a cell 34 of a newly formed grid 16, the grid springs 48 and dimples 46 combine to produce an interference fit with the exterior of the rod 18 passing through each cell 34. The lateral spring force secures the fuel rod 18 laterally within the cell 34. The interference fit of the fuel rod in the cell produces sufficient friction with the springs 48 and dimples 46 so that axial movement of the rods is constrained by compressive, axially acting frictional forces. Also, because the springs 48 and dimples 46 are axially offset in a distance d relative to each other and act in opposition (FIG. 2), there is created a bending moment (arrow B) which tends to deflect the rod 18. For example, the grid springs each exert a grid spring force $F_s$ perpendicular to the direction of the cell axis A (FIG. 2). The dimples 46 produce a dimple force $F_d$ in opposition to the spring force but at respective locations above and below the spring force $F_s$. Thus, a bending moment B is induced in the rod equal to the various forces times the separation d therebetween. The bending moment B tends to deflect the rod, but this tendency alone does not result in severe bowing except when combined with axial compression of the rod coupled with radiation-induced relaxation of the grid springs 48 and dimples 46 in the intermediate grids 16I, whereby the lateral support is diminished.

It is known that a fuel rod 18 tends to grow axially as the fuel becomes spent. Such growth, if restrained, aggravates bowing of the rod 18. In FIG. 3A, the resulting forces on a typical prior art arrangement are shown. The symbols $F_L$, $F_I$, and $F_U$ represent the respective resulting lower, intermediate and upper forces of the springs and dimples acting upon the rod 18 at the respective lower, intermediate and upper grids. When a conventional fuel bundle 10 is initially fabricated, the forces at each of the grid locations are generally uniform. However, as the fuel rod ages and as the various grids 16 are subjected to high radiation, the spring and dimple forces permanently change. (Changes resulting from high temperature may be ignored for purposes of this explanation, although compensation therefor may be made.) In FIG. 3A, after a selected time period (e.g., one year), the spring forces of the intermediate grid 16I are diminished so that the lower and upper spring forces $F_L$ and $F_U$ are respectively much greater than the intermediate force $F_I$. Accordingly, the frictional forces on the rod 18 at the upper and lower locations 16U and 16L are greater than in the intermediate positions 16I, so that an effective compressive force $F_C$ acts axially on the rod 18 and amplifies the bending moment B, causing the rod to bow or bend laterally against the diminished lateral spring force of the intermediate grids 16I as shown by reference numeral 18'. The bow or deflection D may be sufficient to cause the rod 18 to touch an adjacent fuel rod.

In FIG. 3B, a similar arrangement is shown. However, in accordance with the present invention, the spring and dimple forces are adjusted so that the as-fabricated lower force $F_L$ is greater than the intermediate force $F_I$, which in turn is preferably greater than the force $F_U$ at the top of the rod 18. After a selected time interval (e.g., one year), the forces acting on the fuel rod 18 change. But because the upper force $F_U$ is less than the lower force $F_L$ to to begin with, little (if any) compressive force is produced on the rod 18 as a result of aging growth. Accordingly, any bending moment resulting from the offset nature of the springs 48 and dimples 46 is unenhanced. Further, even though intermediate spring force $F_I$ on the rod 18 may significantly decrease due to radiation-induced relaxation, the overall forces on the rod 18 are such that strong intermediate lateral support is not critical, because the tendency of the rod 18 to bow is reduced, as compared with the prior arrangement of FIG. 3A.

In accordance with the present invention, Table I below shows the various ranges and preferred values of spring forces for the respective grids as fabricated, as well as the values after one year.

TABLE I

| Grid | Sping Force | As Fabricated Range/kg. | As Fabricated Preferred Values/kg. | After One Year/kg. |
|------|-------------|-------------------------|-----------------------------------|--------------------|
| 16U  | $F_U$       | .5–2                    | 1.5                               | 1.4                |
| 16I  | $F_I$       | 1.5–6                   | 5.0                               | 0.5                |
| 16L  | $F_L$       | 2–6                     | 3.5                               | 2.5                |

Table II below shows the values of a typical prior art arrangement in which the spring force in each of the grid elements is listed as fabricated and after one year:

TABLE II

| Spring Force | As Fabricated Values/kg. | After One Year/kg. |
|--------------|--------------------------|--------------------|
| $F_U$        | 3.5                      | 3.4                |
| $F_I$        | 3.5                      | 0.35               |
| $F_L$        | 3.5                      | 2.5                |

In the prior art, all the as fabricated spring forces are about the same, e.g., 3.5 kg. However, after one year, the upper spring force is greater than the lower spring force and much greater than the intermediate spring force, which differences result in bowing. In the present invention, different spring forces may be designed into the respective grids. As the fuel bundle ages the Zircaloy components will tend to relax, whereby the lateral support for the fuel rods will be diminished. However, because the upper grid 16U initially has a relatively small spring force acting upon the rod 18, the rod will be allowed to grow axially and thereby avoid the compressive forces which enhance the bending moment and tend to bow the rod, especially in view of the diminished lateral support in the intermediate grids 16I. The bending moment induced in the rod 18 is also somewhat lower than the design of the present invention. However, were the bending to remain the same, there would be little or no deflection of the rod, because the compressive force has been virtually eliminated.

Clearly, the absolute value of the upper spring force $F_U$ in the prior art starts out relatively high and results in a high compressive force. In the present invention, the upper force is relatively low, thus the resulting compressive force is negligible.

While there has been described what at present is considered to be the preferred embodiment of the invention, it would be obvious to those skilled in the art that various changes and modifications could be made therein without departing from the invention. It is intended in the appended claims to cover all such changes and modifications as lie within the spirit and scope of the invention.

I claim as my invention:

1. A nuclear fuel assembly containing a plurality of generally cylindrical fuel rods, comprising:
   a top nozzle;
   a bottom nozzle;
   a control rod guide thimble extending between said top and bottom nozzles;
   a plurality of fuel rod spacer grid assemblies axially disposed along said control rod guide thimble for maintaining the said fuel rods in a spaced lateral array, each of said spacer grid assemblies comprising a plurality of grid straps interlocked into an egg-crate configuration to form cells through which said fuel rods pass, each of said cells having a grid spring and at least one opposing dimple, each said grid spring and opposing dimple having a first selected spring force for a lowermost grid, a second selected spring force for an intermediate grid, and a third selected spring force for an uppermost grid less than said first and second spring forces, said first, second and third spring forces allowing the fuel rods to expand in their respective cells.

2. The nuclear fuel assembly of claim 1, wherein said first spring force is between about 2 to 6 kg.

3. The nuclear fuel assembly of claim 2, wherein said first spring force is about 3.5 kg.

4. The nuclear fuel assembly of claim 1, wherein said second spring force is between about 1.5 to 6 kg.

5. The nuclear fuel assembly of claim 4, wherein said second spring force is about 5 kg.

6. The nuclear fuel assembly of claim 1, wherein said third spring force is between about 0.5 to 2 kg.

7. The nuclear fuel assembly of claim 6, wherein said third spring force is about 1.5 kg.

8. An assembly for supporting a generally cylindrical fuel rod in a nuclear fuel assembly including at least three superadjacent spacer grids, comprising:
   a plurality of grid straps interlocked into an egg-crate configuration to form a cell through which said fuel rod is adapted to pass;
   a grid spring and an opposing dimple disposed in said cell for supporting said fuel rod;
   said grid spring and opposing dimple in each grid having a selected spring force, a lowermost grid being formed of a material having a spring force of about 2 to 6 kg and which material is resistant to radiation-induced relaxation, at least next superadjacent intermediate spacer grid being formed of a material having a spring force of about 1.5–6 kg and which material has a relatively low neutron absorption cross-section, and an uppermost spacer grid formed of a material having a spring force of about 0.5 to 2 kg.

9. An assembly as set forth in claim 8, wherein said lowermost grid secures the fuel rod axially and laterally, and wherein said uppermost superadjacent grid supports the fuel rods with diminishing axial and lateral force so as to permit axial expansion of the fuel rods with diminishing compressive force thereon.

10. An assembly as set forth in claim 8 wherein said uppermost and lowermost grids contain springs fabricated from Inconel and said at least one intermediate grid is formed of at least one of zirconium and zirconium alloy.

11. An assembly for supporting rods in a nuclear fuel assembly, which rods axially expand during use, and including at least three superadjacent spacer grids, comprising:
   a plurality of grid straps interlocked into an egg-crate configuration to form cells through which a corresponding òne of said fuel rods is adapted to be located;
   spring means disposed in each cell for supporting said fuel rod therein;
   said spring means in each cell having a selected spring force, the first of said grids being formed of a material having a relatively high spring force and which material is resistant to radiation-induced relaxation for securing the fuel rods axially in place, at least one axially adjacent intermediate spacer grid being formed of a material having a spring force less than the first grid and which material has a relatively low neutron absorption cross-section, and a remote spacer grid axially adjacent and furthest removed from the first grid, said remote grid being formed of a material having a spring force less than the first grid, said remote grid allowing the fuel rods to axially expand and slip in the cells.

* * * * *